Aug. 24, 1926.  
L. E. ROBY  
1,596,892  
ATTACHMENT MEANS FOR WAGON BOX CLOSURE MEMBERS  
Filed Sept. 18, 1925
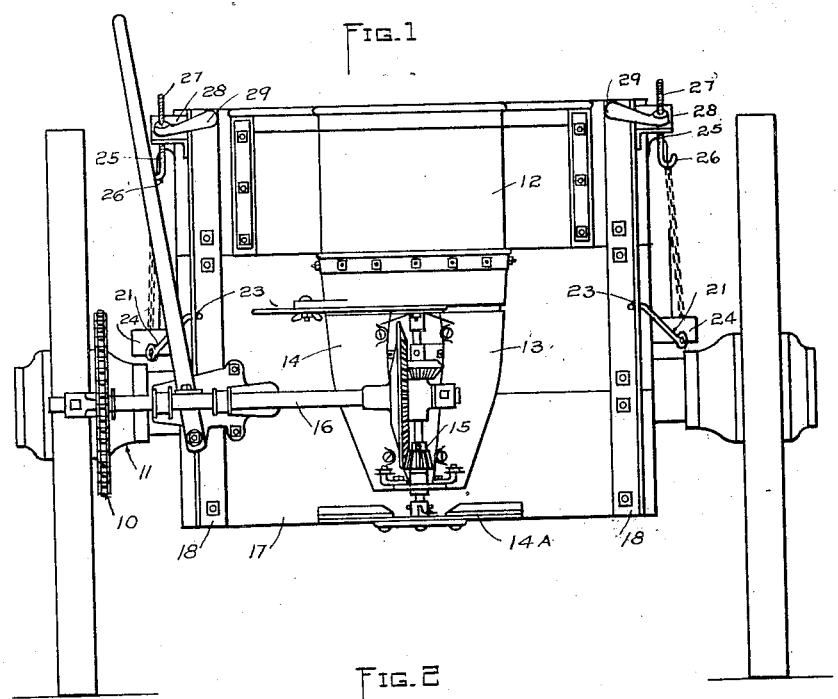
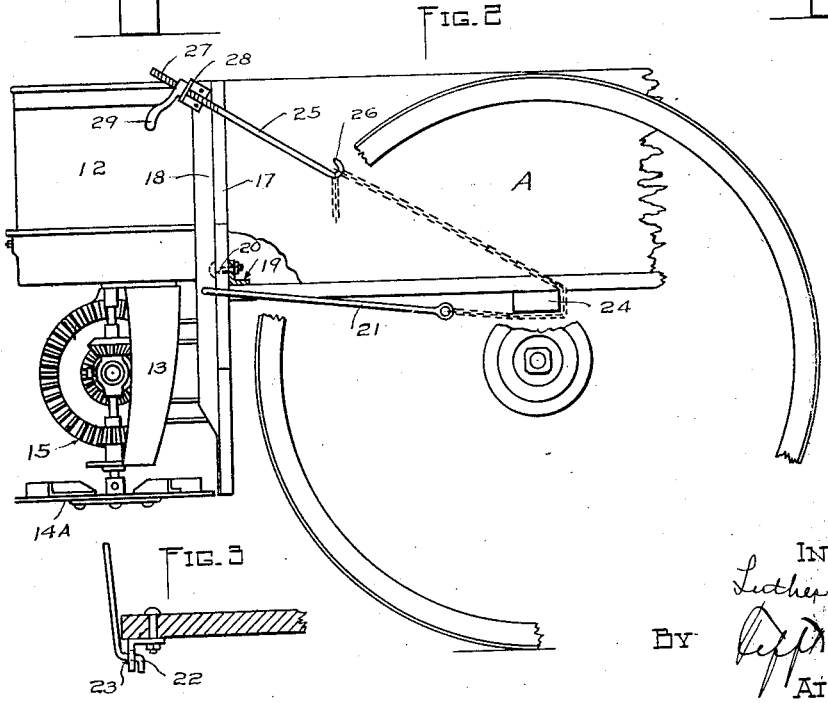

Patented Aug. 24, 1926.

1,596,892

UNITED STATES PATENT OFFICE.

LUTHER E. ROBY, OF PEORIA, ILLINOIS.

ATTACHMENT MEANS FOR WAGON BOX CLOSURE MEMBERS.

Application filed September 18, 1925. Serial No. 57,093.

My invention relates to an attachment mechanism adapted to support a distributing mechanism upon the end portion of a formal wagon member.

The object of the invention is the provision of simple attachment mechanism for fixedly supporting a closure member against the rear end of a wagon box.

Another object thereof is the provision of adjustable tensionable attachment mechanism for firmly positioning a closure member against the open end of a wagon box.

Still another object is the provision of attachment mechanism for supporting a distributing mechanism upon a wagon box, whereby said member will be held against lateral movement.

A further object is the provision of attachment mechanism adapted to fixedly support a distributing mechanism against the end of the wagon box, said mechanism being fashioned to support the distributing mechanism in a manner to prevent the breaking down of the wagon box, due to the excessive weight of said mechanism.

Other objects of the invention will appear in the following specification, taken in connection with the annexed drawings, in which—

Fig. 1 is an end elevation, showing the distributing mechanism attached in operating position upon the wagon box;

Fig. 2 is a side elevation, showing the manner of attaching the distributing mechanism, and Fig. 3 is an enlarged detail of a portion of the attachment means.

Referring to the above drawings, there is shown in Figs. 1 and 2 a well known type of distributing mechanism which is used mainly in the broadcasting of fertilizer or seeds. But one type of distributing mechanism is illustrated, although it is apparent that any type of distributing device might be shown, inasmuch as the present application is directed to the attachment means, per se, and not to the distributing device. The present distributing mechanism is of the class of devices that are adapted for removable engagement with the rear end of the conventional farm wagon. Obviously, such devices have merit in the fact that they do away with the necessary traction portions and by mere attachment to a wagon box become an operable machine, the power connection in the present instance being through a sprocket and chain connection 10 with the hub 11 of the wagon member generally referred to as A. Inasmuch as the present application is directed to the attachment mechanism, per se, only a general description of the distributing mechanism is thought necessary. The latter comprises a hopper member 12, communicating, upon its inner side, with the wagon box. Adjustable spout members 13 and 14 deliver material in the hopper to a fan member 14$^A$ disposed therebelow. Means for rotating the fan member comprises the gear connection 15 and drive shaft 16 connected with the before described sprocket and chain member 10. Obviously, a forward movement of the wagon results in rotation of the fan member and a consequent broadcasting of the material delivered thereon by the spout members. The distributing mechanism is attached to a closure member 17 which takes the place of the formal end-gate, that is removed, said closure member providing a direct connection between the hopper member and the wagon box, whereupon an operator standing in the wagon box, may shovel material directly into said hopper.

Distributing mechanisms of the type shown have been used for a considerable length of time, and the usual manner of attachment to the wagon box is by removing the end-gate and having such connections on the closure member supporting the distributing mechanism, that the same may slide into the cleat or guide members that normally hold said end-gate. The results of such manner of attachment were the breaking down of the rear end of the wagon, due to the excessive weight of the distributing mechanism, and also an unavoidable lateral movement of the distributing mechanism, due to the loose connection between the said mechanism and the wagon box.

Applicant, as a manufacturer of such devices, desiring to overcome the objections of the above described manner of attaching such distributing mechanism, finally devised the present mechanism for fixedly attaching the distributing mechanism to the end portion of a wagon box.

It will be noted that the closure member 17 supporting the distributing mechanism has angle irons 18 disposed at either side and one of the angles thereof upstanding in a manner to provide one of the attachment ends for the closure supporting means, namely in the manner shown in Fig. 3. The closure member has a horizontally disposed inwardly projecting seat portion 19 attached thereto, as at 20, the same being adapted to rest upon the bottom of the wagon box, as the closure member is placed in the open end thereof, the side portions of the closure member abutting the ends of the wagon box in a manner to coincide substantially therewith. The attachment means, per se, comprises one pair of rod members 21, having their attachment ends fashioned as at 22 for engagement with perforations 23 in the angle irons 18. Engagement of these rod members with the perforations 23 is possible when said rod members are loose, but upon a tensioning of said rod members, removal thereof is prevented. Chain members are connected to the opposed ends of the rod members 21, said chain members passing about projecting portions 24 of the wagon box frame, and the opposed ends of said chain members or link portions therein engage a second pair of rod members 25, or rather the hooked ends 26 of such rod members. These latter rod members 25 have their threaded ends 27 projecting through brackets 28 fixedly attached to the closure member 17. Handle portions 29, threaded upon the projecting ends of the rod members 25, provide means for applying tension to said attachment mechanism.

The above described attachment mechanism is adaptable to any type of wagon box and may be readily applied to furnish the means for holding the distributing mechanism in a fixed position upon the open end thereof.

As may be clearly seen from the drawings, the closure member supporting the distributing mechanism is attached directly to the sturdy frame or wagon bed that supports the wagon box, and hence is fixedly located in a much more substantial manner than if it were merely slid into the guideways that receive the ordinary end-gate.

What I claim is:

1. In a device of the class described, in combination, a wagon box frame, a wagon box, a closure member therefore and means for attaching said closure member to the wagon box in a fixed position with relation to the wagon box frame, said means including a pair of rod members having a demountable connection with the closure member, a second pair of rod members having an adjustable, tensionable connection with the closure member and chain members connecting the opposed ends of the rod members and encircling portions of the wagon box frame.

2. In a device of the class described, in combination, a wagon box frame, a wagon box, a closure member therefor, means for attaching said closure member to the wagon box, including a horizontally disposed seat attached to the inner side of the closure member and adapted to abut the bottom end of the wagon box, a pair of rod members attached to the closure member, a second pair of rod members attached to the closure member, and chain members connecting the opposed ends of adjacent rod members, said chain members encircling portions of the wagon box frame in a manner to fixedly position the closure member on the wagon box.

3. In a device of the class described, in combination, a wagon box, a closure member therefor, and means for attaching said closure member to the wagon box, including a pair of rod members attached to the closure member at points intermediate the sides thereof, a second pair of rod members disposed a substantial distance above said first named rod members and having adjustable mountings with respect to said closure member, and detachable chain members fastening the opposed ends of adjacent rod members to the wagon box in a manner to hold the closure member in a fixed position thereon.

4. In a device of the class described, in combination, a wagon box, a closure member therefor, means for attaching said closure member to the wagon box in a fixed position with relation thereto, said means including a pair of rod members having an adjustable, tensionable connection with the closure member, and chain members adapted to encircle portions of the wagon box and to engage at their respective ends the rod members and the closure member.

In testimony whereof, I have affixed my signature.

LUTHER E. ROBY.